Aug. 18, 1931.  J. ROBINSON  1,819,386
AUTOMATIC TRAIN PIPE CONNECTER
Filed Oct. 21, 1921
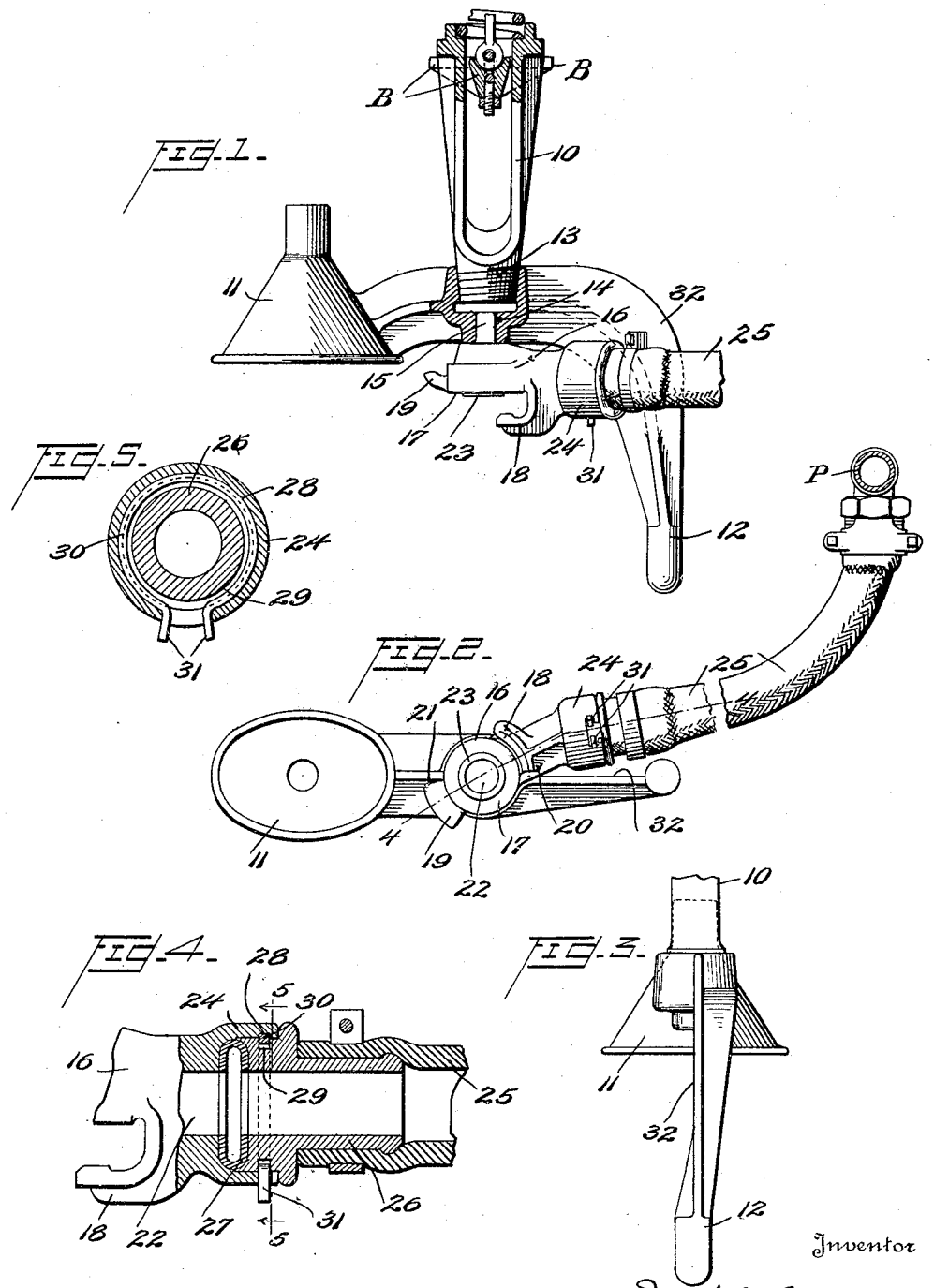

Patented Aug. 18, 1931

1,819,386

UNITED STATES PATENT OFFICE

JOSEPH ROBINSON, OF MORRISTOWN, NEW JERSEY

AUTOMATIC TRAIN PIPE CONNECTER

Application filed October 21, 1921. Serial No. 509,371.

This invention relates to automatic train pipe connecters and particularly to an arrangement for facilitating connection between the hose of a car having an automatic connecter and a car not provided with such a connecter.

It is the object of the invention to provide an improved interchange construction in which it is unnecessary to employ a dummy or other extra part in making connection between a car equipped with an automatic connecter and one not so equipped. A further object is to provide a device which is fastened to the hose of the car and removably mounted on the connecter head so as to form a part thereof when the connecter head is coupled to a mating head and which without disconnection from the hose can be easily and quickly detached from the head and connected to the hose of a car not provided with an automatic connecter.

The invention is set forth in detail in the following specification and illustrated in the accompanying drawings forming a part thereof in which drawings:—

Figure 1 represents a plan view partly in section of a connecter head and its supporting member, the head having my improved device applied thereto;

Figure 2 is a front view of the connecter illustrated in Figure 1;

Figure 3 is a side view of the head showing the particular construction of the pin;

Figure 4 is a longitudinal sectional view on the line 4—4 of Figure 2 illustrating the manner of attaching the hose to the coupling forming part of my improved device; and Figure 5 is a sectional view on the line 5—5 of Figure 4.

Referring to the drawings in detail, 10 represents the member for supporting the connecter head it being understood that this member is pivotally supported in any desired manner on a bracket B depending from the car coupler. A form of pivotal support, such as that illustrated in my co-pending application Serial No. 341,887, may be employed. The connecter head as shown in the drawings is of the pin and funnel type although it is to be understood that the invention may be applied to other forms of connecter heads. In the form of head shown, 11 indicates the funnel and 12 the pin, these parts being adapted to cooperate with corresponding parts of a mating head to properly center the heads when two cars are brought into coupled relation. The member 10 is secured to the rear portion of the head in any suitable manner as by means of screw threads 13. The central portion of the head is provided with a suitable opening or socket 14 which is adapted to receive a shank or projection 15 formed upon the rear side of a coupling member 16 which is constructed substantially the same as the ordinary or standard hand operated hose coupling such as illustrated at $k$ in the patent to Forsyth 740,749, October 6, 1903. The coupling member 16 is provided with a front face 17 which is adapted to contact with a similar face formed on a similar coupling member of a mating head. The coupling member 16 is also provided with the usual heel 18 and with toe 19, these parts being cut away or restricted in length as shown at 20 and 21 respectively so that the toe 18 lies above and the heel 19 below the horizontal center line of the head. By so arranging these parts they will not contact with or jam against the corresponding parts of a mating coupling member. In short it will be understood that the coupling member 16 is removably mounted on the head by engagement of the shank 15 with the socket 14 and that such coupling members 16 on adjacent heads are so arranged that when brought together the coupling faces 17 thereof will come into contact and the toe and heel portions 18 and 19 will not interfere with such contact between the faces 17. The face 17, in other words, is arranged at right angles to the longitudinal axis of the head, that is, at right angles to a line extending from the front to the rear of the head at substantially the center thereof.

The coupling member 16 is further provided with a central opening or passage 22 surrounded by a suitable gasket 23, such gaskets on mating heads serving to provide a tight joint when mating heads come together. An extension 24 is formed at one side of the coupling member 16 and the passage 22 leads through this extension. The extension 24 is connected in any suitable manner to the hose 25 which in turn is connected to the ordinary train pipe P indicated in Figure 2 which is mounted on the car in the usual manner. For connecting the extension 24 to the hose 25, the arrangement shown particularly in Figures 4 and 5 of the drawings is preferably employed and which comprises a union 26 connected to the hose and provided with an enlarged portion adapted to fit within the extension 24, a suitable gasket 27 being positioned between such parts. The inner wall of the extension 24 is provided with a groove 28 and a similar groove 29 is formed on the exterior surface of the union 26. An expansible ring or locking device 30 is arranged in the groove 29 of the union 26 and is provided with arms or extensions 31 by which the same may be contracted. When the ring 30 is contracted into the groove 29 the enlarged portion of the union may be inserted into the extension 24 of the coupling member, and when this is done and the ring 30 permitted to expand into the groove 28, it serves to lock the union 26 to the coupling member 16 but when so locked the member 16 may be freely rotated relative to the hose 25.

To properly position the coupling member 16 on the head, the pin 12 is so formed that the top of the intermediate portion thereof lies in the horizontal central plane of the head as shown at 32, Figure 3, so that such portion may lie beneath the extension 24 of the coupling head or the union 26. Thus when the shank 15 is inserted in the socket 14 and the extension or union rests on top of the pin, the coupling member will be properly positioned on the head. The normal tendency of the hose 25 is to rotate the coupling member downwardly and thus hold its extension 24 or the union 26 against the pin 12, and as the hose 25 is attached to the car or train pipe behind the coupling, there will also be a slight tension on the hose tending to pull the coupling member rearwardly and hold the shank 15 in the socket 14 of the head.

From the foregoing it will be apparent that when it is desired to make connection between the hose of a car equipped with my improved device and one not so equipped, it is only necessary to disengage the coupling member 16 from the head and then rotate such member relative to the hose 25 to bring its coupling face 17 into proper position to be coupled with the ordinary hand hose coupling on the unequipped car. Such rotation is necessitated by the fact that the ordinary hand hose coupling in general use has the face thereof turned rearwardly or toward the car on which it is carried. Therefore to get the member 16 into proper position to connect with such a coupling on an adjacent car it is necessary to rotate this member approximately 180° from the position shown in Fig. 1. By this arrangement it is unnecessary to employ an extra part or dummy in making interchange and the number of sharp turns or bends in the fluid passage is reduced to a minimum so that little obstruction to the flow of the fluid exists when mating coupling heads are connected or when interchange is made between a car equipped with my improved device and one not so equipped. Furthermore, such interchange may be easily and quickly made and no tools of any kind are necessary for that purpose.

Having thus described my invention what is claimed as new and desired to be secured by Letters Patent is:

1. In an automatic train pipe connecter, in combination, a connecter head, a train pipe hose, means for centering said head on a mating head, a coupling rotatably mounted on the end of said hose, said coupling having a flat face thereon adapted to form the coupling face of the head when said coupling is mounted on the head, means for detachably mounting said coupling on said connecter head with said flat face thereof arranged at right angles to the longitudinal direction of the connecter, whereby said coupling may be detached from said head and rotated to a position to engage a conventional type of railway hand hose coupling.

2. A structure as specified in claim 1 in which said last mentioned means comprise a socket in the head and a pin on said coupling for engaging said socket.

In testimony whereof I hereunto affix my signature.

JOSEPH ROBINSON.